(12) United States Patent
Oh

(10) Patent No.: US 8,423,281 B2
(45) Date of Patent: Apr. 16, 2013

(54) APPARATUS AND METHOD FOR PROVIDING TRAVEL ROUTE IN NAVIGATION SYSTEM

(75) Inventor: Hwan Saeng Oh, Soowon-si (KR)

(73) Assignee: LG Electronics Inc., Seoul (KR)

( * ) Notice: Subject to any disclaimer, the term of this patent is extended or adjusted under 35 U.S.C. 154(b) by 1363 days.

(21) Appl. No.: 10/859,980

(22) Filed: Jun. 4, 2004

(65) Prior Publication Data

US 2004/0249569 A1 Dec. 9, 2004

(30) Foreign Application Priority Data

Jun. 5, 2003 (KR) .......... 10-2003-0036506

(51) Int. Cl.
*G01C 21/00* (2006.01)

(52) U.S. Cl.
USPC .......................................... 701/400

(58) Field of Classification Search .......... 701/209, 701/201, 202, 208; 340/995.19, 995.23, 340/995.13
See application file for complete search history.

(56) References Cited

U.S. PATENT DOCUMENTS

| | | | | |
|---|---|---|---|---|
| 5,612,881 A | * | 3/1997 | Moroto et al. | 701/209 |
| 5,787,383 A | * | 7/1998 | Moroto et al. | 701/210 |
| 6,236,933 B1 | * | 5/2001 | Lang | 701/117 |
| 6,282,492 B1 | * | 8/2001 | Gorai et al. | 701/209 |
| 6,446,002 B1 | | 9/2002 | Barton | |
| 6,680,674 B1 | * | 1/2004 | Park | 340/905 |
| 7,031,831 B2 | * | 4/2006 | Kaji et al. | 701/210 |
| 7,191,409 B2 | * | 3/2007 | Petersen | 715/827 |
| 2002/0129148 A1 | * | 9/2002 | Ritz et al. | 709/225 |
| 2003/0130788 A1 | * | 7/2003 | Akashi | 701/209 |

FOREIGN PATENT DOCUMENTS

| | | |
|---|---|---|
| EP | 1 152 383 A2 | 11/2001 |
| JP | 5-216397 A | 8/1993 |
| KR | 10-1999-0058344 A | 7/1999 |
| KR | 10-2003-0008581 A | 1/2003 |
| WO | WO-03040654 | 5/2003 |

* cited by examiner

*Primary Examiner* — Khoi Tran
*Assistant Examiner* — Nicholas Kiswanto
(74) *Attorney, Agent, or Firm* — Birch, Stewart, Kolasch & Birch, LLP

(57) ABSTRACT

An apparatus and method provide a travel route in a navigation system. The apparatus includes: a GPS (Global Positioning System) receiver for receiving position data from a plurality of GPS satellites; a storage unit for storing map data and the travel route therein; a display unit for displaying the stored map data and travel route on a screen; a key input unit for receiving a variety of input key signals, and an origin and a destination therebetween; a velocity and direction detection unit for detecting a travel velocity and direction of travel of a moving object; a wireless communication unit for communicating to receive traffic information on an on-road; and a control unit for controlling each unit to store the travel route in the storage unit and to provide the stored travel route for a user.

33 Claims, 7 Drawing Sheets

| Hot key | Date | Origin node (Node1) | Via node | | | Destination node (Node n) | Travel route | Destina -tion |
|---|---|---|---|---|---|---|---|---|
| | | | Node2 | Node3 | Node4 | | | |
| 1 | 2003.1.2 | A1 | A2 | A3 | A4 | A5 | P1 | LG |
| 2 | 2003.2.3 | A1 | B2 | B3 | B4 | B5 | P2 | Company |
| 3 | 2003.3.2 | A1 | C2 | C3 | C4 | Cn | P3 | Friend |
| . | . | . | . | . | . | . | . | . |
| . | . | . | . | . | . | . | . | . |
| 11 | 2003.5.5 | Bn | B4 | B3 | B2 | A1 | P11 | Home |

| Hot key | Date | Origin node (Node1) | Via node | | | Destination node (Node n) | Travel route | Destina -tion |
|---|---|---|---|---|---|---|---|---|
| | | | Node2 | Node3 | Node4 | | | |
| 1 | 2003.1.2 | A1 | A2 | A3 | A4 | A5 | P1 | LG |
| 2 | 2003.2.3 | A1 | B2 | B3 | B4 | B5 | P2 | Company |
| 3 | 2003.3.2 | A1 | C2 | C3 | C4 | Cn | P3 | Friend |
| ⋮ | ⋮ | ⋮ | ⋮ | ⋮ | ⋮ | ⋮ | ⋮ | ⋮ |
| 11 | 2003.5.5 | Bn | B4 | B3 | B2 | A1 | P11 | Home |

| Hot key | List of travel routes | Origin | Destina -tion | Remarks |
|---|---|---|---|---|
| 20 | Friend1 | A1 | Dn | Voice service O |
| 30 | Family1 | A1 | En | Voice service X |
| 40 | Associate1 | A1 | Fn | Voice service O |

APPARATUS AND METHOD FOR PROVIDING TRAVEL ROUTE IN NAVIGATION SYSTEM

The present application claims, under 35 U.S.C. §119, the benefit of Korean Patent Application No. 36506/2003 filed Jun. 5, 2003, the entire content of which is fully incorporated herein by reference.

BACKGROUND OF THE INVENTION

1. Field of the Invention

The present invention relates to a navigation system, and more particularly, to an apparatus and method for providing a travel route in a navigation system, in which a predetermined travel route of a moving object can be stored and repeatedly used according to need.

2. Description of the Related Art

In general, a navigation system displays a current location of a moving object on a map, which is displayed on a screen. The current location is calculated using information that is received from a global positioning system (hereinafter, referred to as a "GPS").

Additionally, the navigation system provides a driver with a variety of information necessary for a travel of the moving object, such as a direction of travel of the moving object, a distance to the desired destination, a current travel velocity of the moving object, a route that is previously set by a driver, an optimum route to the destination, and the like.

The navigation system (or GPS) is installed in various kinds of moving objects, such as vehicles, airplanes and automobiles, and is widely used to check a current location and travel velocity of the moving object or to determine a travel route of the moving object. Specifically, the navigation system receives radio waves indicating latitude, longitude and altitude from a plurality of GPS satellites, performs a calculation operation, and visually or audibly informs the driver of map information including the current location of the moving object.

FIG. 1 shows a construction of a related navigation system.

Referring to FIG. 1, a GPS receiver 102 receives predetermined location data through an antenna for the purpose of a navigation service. The location data are transmitted from a plurality of GPS satellites 100. A velocity sensor/gyro sensor 104 constitutes a sensor part and senses a rotational angle and velocity of a moving object.

An input unit 106 is a user interface configured to receive various input key signals received from a user and to set a travel route.

A map data storage unit 108 stores map data and other additional information data. In general, the map data storage unit 108 is implemented with compact disk-read only memory (CD-ROM).

A control unit 110 controls an overall operation of the navigation system. The control unit 110 determines a current location of the moving object by using a reception signal of the GPS receiver 102 and matches the determined current location with the map data stored in the map data storage unit 108.

In case the user inputs an origin and a destination through the input unit 106, the control unit 110 searches to determine a travel route from the current location of the moving object to the destination by referring to the map data stored in the map data storage unit 108. The searched and determined traveling route is displayed on a digital map of a display unit 114 through a display driving unit 112.

Moreover, the travel route of the moving object can be guided by a guidance voice that is outputted through a speaker 118 by a voice guidance unit 116.

The navigation system receives GPS satellite signals from the plurality of GPS satellites 100 located over the earth and checks the current location and the direction of travel of the moving object to thereby track a travel trace. Additionally, the navigation system provides the driver with the shortest route among several travel routes from the origin to the destination.

Meanwhile, the related navigation system tracks the location of the moving object on a road to exactly display the moving object's current location on a road map, and provide a traffic road environment to the destination or various available information such as, for example, an oil station, government and public offices, and the like.

The related navigation system provides necessary information when the user desires to receive the travel route to the destination, but has a drawback in that a user cannot reuse the provided information and accordingly, a user should have trouble performing the same repetitive search, thereby deteriorating a reliability of the product.

Further, the conventional navigation system has a drawback in that when a user uses a search service center for all necessary information, a service charge is added, thereby resulting in the unnecessary search cost for the same information.

SUMMARY OF THE INVENTION

Accordingly, the present invention is directed to an apparatus and method for providing a travel route in a navigation system that substantially obviates one or more problems due to limitations and disadvantages of the related art.

It is an object of the present invention to provide an apparatus and method for providing a travel route in a navigation system, in which a predetermined travel route of a moving object can be stored and repeatedly used according to need.

It is another object of the present invention to provide an apparatus and method for providing a travel route in a navigation system, in which the travel route received from a traffic information center can be stored and repeatedly used according to need.

It is further another object of the present invention to provide an apparatus and method for providing a travel route in a navigation system, in which a widely used travel route, a storage-desired destination or the like is stored and used as a reference such that a specific traveling route is not connectively downloaded from a traffic information center.

Additionally advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In an aspect of the present invention, there is provided an apparatus for providing a travel route in a navigation system, the apparatus including: a GPS (Global Positioning System) receiver for receiving position data from a plurality of GPS satellites; a storage unit for storing map data and the travel route therein; a display unit for displaying the stored map data and travel route on a screen thereof; an input key unit for receiving a variety of input key signals, and an origin and a destination therebetween; a velocity and direction detection unit for detecting a travel velocity and direction of a moving object; a wireless communication unit for communicating to receive traffic information on an on-road; and a control unit for controlling each unit to store the travel route in the storage unit and to provide the stored travel route for a user.

In another aspect of the present invention, there is provided a method for providing a travel route in a navigation system, the method including the steps of: (a) a user's inputting an origin and a destination; (b) determining whether or not the travel route corresponding to the received origin and destination is identical with a travel route stored in a storage unit; (c) if it is determined as the determination result that the corresponding traveling route is identical with the stored traveling route, reading the stored travel route from the storage unit; and (d) displaying the read travel route on a screen for guidance of a moving object.

In another aspect of the present invention, there is provided a method for providing a travel route in a navigation system, the method including the steps of: (a) determining whether or not a user inputs an origin and a destination of a travel route for guidance of a moving object; (b) if it is determined as the determination result that the user inputs the origin and the destination, recognizing a current position and a travel direction of the moving object on the basis of a GPS (Global Positioning System) signal to track the moving object along a travel trace, and searching an optimal travel route from the origin to the destination; (c) displaying the searched optimal travel route on a screen to guide the moving object along the optimal travel route; (d) determining whether or not the moving object arrives at the destination and then, if it is determined that the moving object arrives at the destination, inquiring of the user whether or not a current travel route would be stored; and (e) if the user determines to store the current travel route, storing the current travel route in a predetermined area of a storage unit.

For user's convenience for using the moving object employing the navigation system, the present invention stores a frequently used travel route, a necessary travel route or the like to allow the use of the stored travel route according to need such that the stored travel route is repetitively used despite communication error or damaged data.

BRIEF DESCRIPTION OF THE DRAWINGS

The accompanying drawings, which are included to provide a further understanding of the present invention and are incorporated in and constitute a part of this application, illustrate exemplary embodiment(s) of the present invention and together with the description serve to explain the principles of the present invention. In the drawings.

DETAILED DESCRIPTION OF THE PREFERRED EMBODIMENTS

Reference will now be made in detail to an exemplary embodiment of the present invention with reference to the attached drawings.

Figure 1:
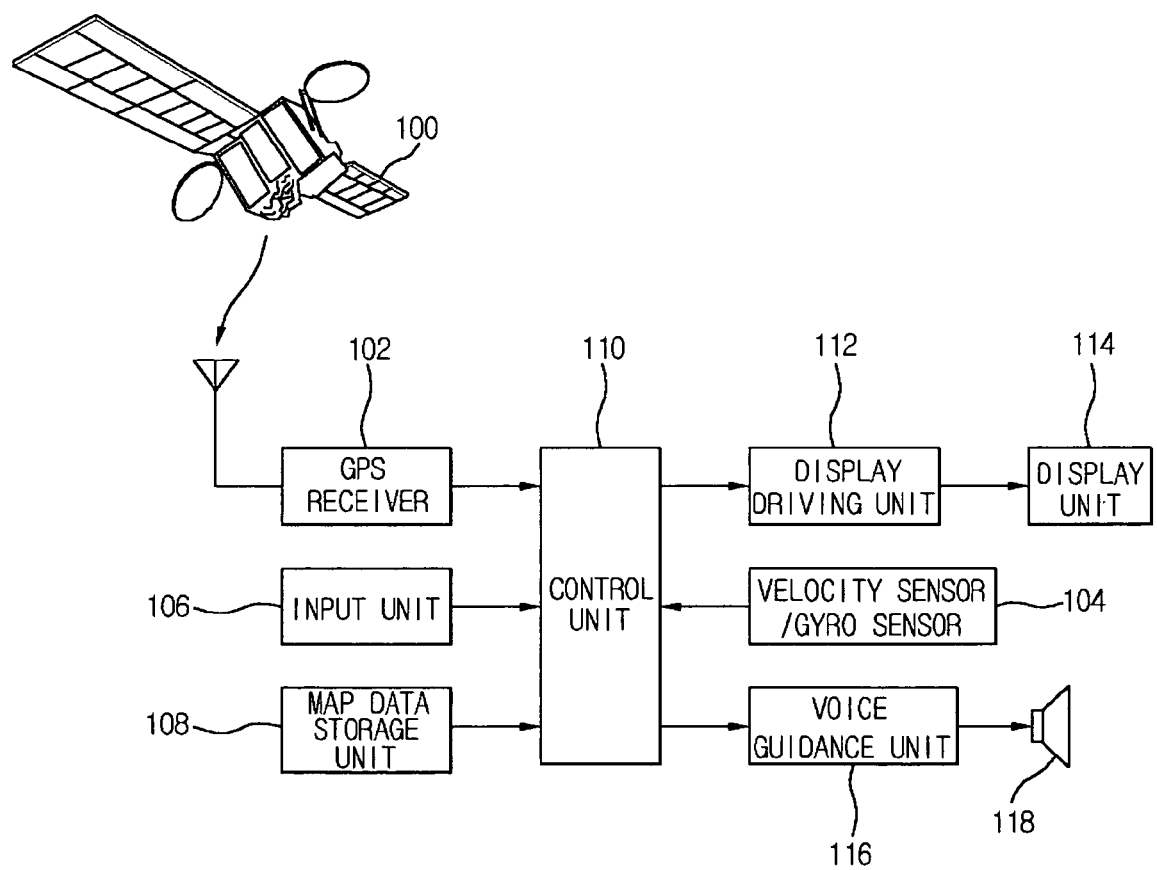
FIG. 1 illustrates a construction of a related navigation system.
Figure 2:
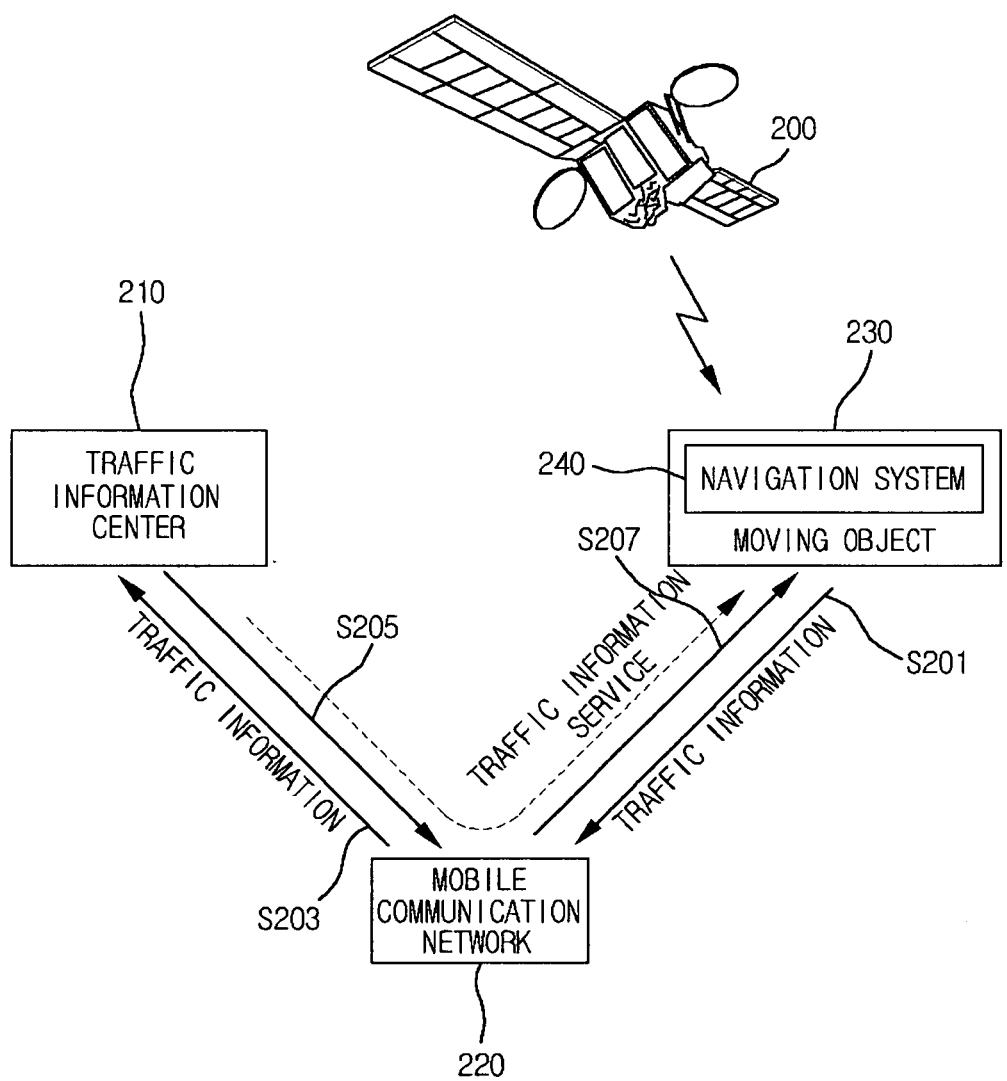
FIG. 2 illustrates a service network of a navigation system according to an exemplary embodiment of the present invention.

As shown in FIG. 2, a navigation system according to the present invention includes: a traffic information center 210 for collecting and providing traffic information on the flow of vehicles; a navigation system 240 installed in a moving object 230 to search and determine a travel route by using location data received from a plurality of GPS satellites 200 and a map data stored in a memory, and to use a traffic information service; and a mobile communication network 220 for enabling a wireless communication between the traffic information center 210 and the navigation system 240.

An operation of the navigation system constructed as above will be described below.

Referring to FIG. 2, the navigation system 240 detects the current location of the moving object 230 by using the location data received from the plurality of GPS satellites 200 and signals sensed by a plurality of sensors, which are installed in the moving object 230, such as a gyro sensor for sensing a direction of travel of the moving object and a velocity sensor for sensing a travel velocity of the moving object.

The navigation system 240 map-matches the detected current locations of the moving object 230 with the map data stored in the memory, and search a travel route from the current location to the destination by using the map data. Additionally, the navigation system has a function of searching and guiding the optimum route, which allows the moving object to travel to the destination along the searched and determined travel route.

The navigation system 240 requests service information, such as real-time traffic information, route guidance information and telephone connection, to the traffic information center 210 through the mobile communication network 220 (S201 and S203). Additionally, the navigation system 240 receives traffic information service from the traffic information center 210 through the mobile communication network 220 (S205 and S207).

Figure 3:
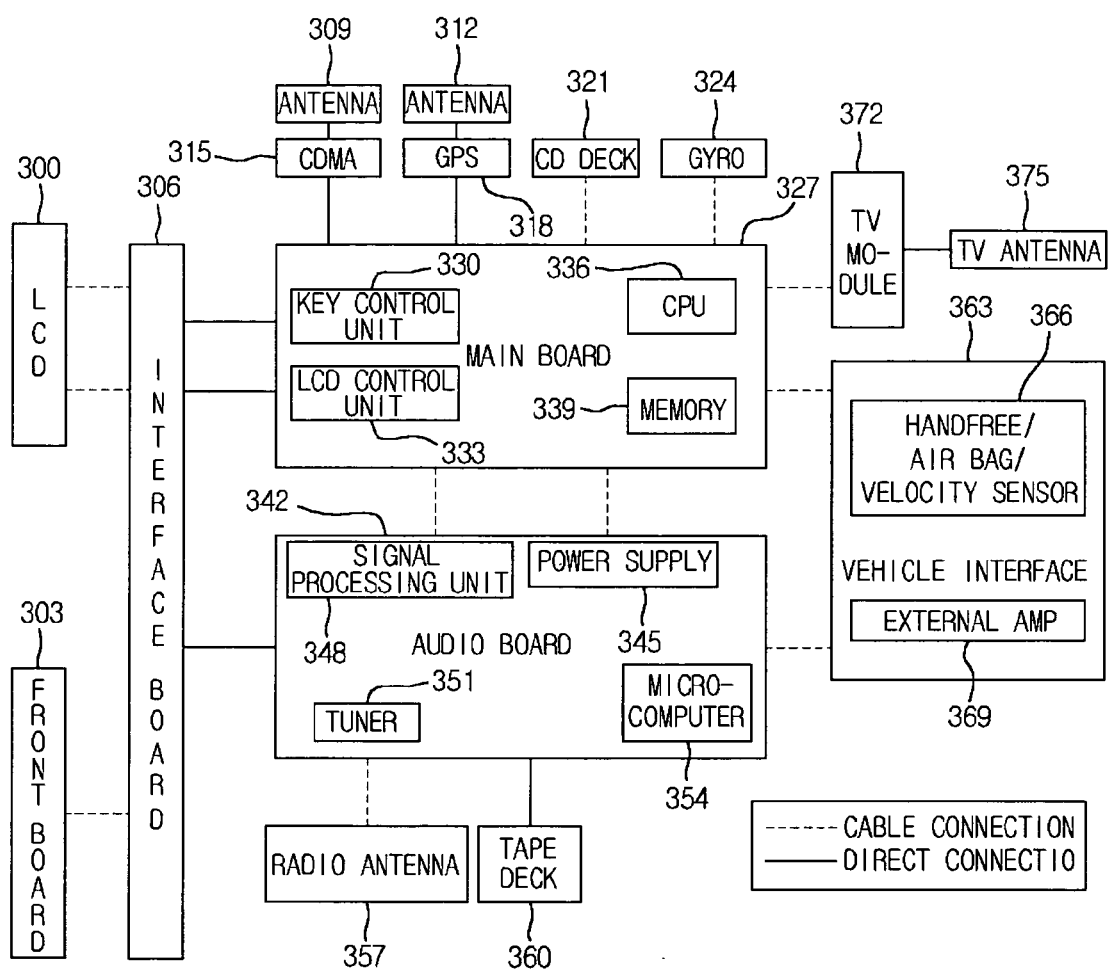
FIG. 3 illustrates a detailed construction of a navigation system according to an exemplary embodiment of the present invention.

FIG. 3 is a block diagram of a navigation system according to the present invention.

Referring to FIG. 3, the navigation system includes an interface board 306, a main board 327, an audio board 342 for processing an audio signal, and a vehicle interface 363.

The interface board 306 is connected between the main board 327 and the audio board 342, and an LCD 300 and a front board 303, and performs an interface function therebetween.

The main board 327 includes a central processing unit (CPU) 336 for controlling the system; a memory 339 for storing the map information which is necessary to display the travel route on the map of a road where the moving object travels, and storing the traveling route; an input key control unit 330 for controlling an input key signal; and an LCD control unit 333 for controlling a display operation of LCD.

The main board 327 is connected via cable or directly to a CDMA communication unit 315, a GPS receiver 318 for receiving GPS signals, a CD deck 321 for reproducing and recoding signals of disk (CD, DVD, etc.), and a gyro 324. Here, the CDMA communication unit 315 is a mobile communication terminal having an equipment identification number. The CDMA communication unit 315 and the GPS receiver 318 receive signals through antennas 309 and 312, respectively.

Additionally, a TV module 372 is connected to the main board 327 to receive TV signals through a TV antenna 375. The LCD 300 and the front board 303 are connected to the main board 327 through the interface board 306. The LCD 300 and the front board 303 are controlled by the LCD control unit 333 and the key control unit 330, respectively.

The LCD 300 functions to display a variety of video and non-video, including character, signals. The front board 303 includes various buttons and provides a corresponding input key signal of a selected input button to the main board. The front board 303 includes a menu key or button for directly inputting the traffic information according to an embodiment of the present invention.

The audio board 342 interfaces with the main board 327 and includes a microcomputer 354, a tuner 351 for receiving a radio signal, a power supply 345, and a signal processing unit 348 for processing signals to output a variety of audio signals.

Additionally, a radio antenna 357 for receiving the radio signal, a tape deck 360 for reproducing an audiotape, and an amp 369 for outputting the audio signal are connected to the audio board 342. The audio board 342 is connected to the interface board 306.

The vehicle interface 363 is an interface means for transmitting/receiving signals to/from the amp 369 and hand-free/air bag/velocity sensor 366, which are mounted on the moving object, and transmits/receives signals to/from the audio board 342 and the main board 327. The velocity sensor for sensing the velocity of the moving object, the air bag for securing a safety, and the hand-free 366 for receiving an audio signal without using the driver's own hands are connected to the vehicle interface 363. The velocity sensor provides the velocity information to the central processing unit 326 in order to sense the velocity of the moving object.

The navigation system is a combination system that can provide a variety of wireless data services, a mobile communication and broadcasting reception through a connection to a variety of audio and video devices and an addition of a telematics function, as well as the navigation service of the moving object.

For the purpose of the mobile communication service, the CDMA communication unit 315 wirelessly transmits/receives signals to/from the mobile communication network through the antenna 309. The received signal is transmitted to the audio board 342 under a control of the central processing unit 327 and then processed through the signal-processing unit 348 of the audio board 342. Then, the processed signal is outputted through the amp 369 under a control of the microcomputer 354.

The TV signal received through the TV antenna 375 for the purpose of receiving TV broadcasting is processed through the TV module 372. Then, the processed TV reception signal is displayed in a form of a video signal on the LCD 300 through the interface board 306 under a control of the LCD control unit 333. Additionally, the audio signal of the TV reception signal is outputted through the audio board 342 and the amp 369.

An audio signal of the radio signal that is received through the tuner 351 for the purpose of the radio broadcasting and an audio signal of an audio tape that is received through the tape deck 360 are outputted through the audio board 342 and the amp 369. The audio signal reproduced through the deck 321 is also outputted through the amp 369, and a variety of the video signals are displayed on the display unit, i.e., the LCD 300.

In the present invention, the user can use the navigation system to select and input traffic information of various variable environments that can occur with respect to a road on which a vehicle can travel, that is, traffic stagnation, traffic retardation, slow traffic movement, traffic accident(s), road(s) under-construction, and the like. The user can allow the selected traffic information, the moving object travel velocity, and the current location of the moving object to be transmitted with a message to the traffic information center.

A method for providing the travel route in the navigation system according to the present invention will be described with reference to FIGS. 3 and 4.

Figure 4:
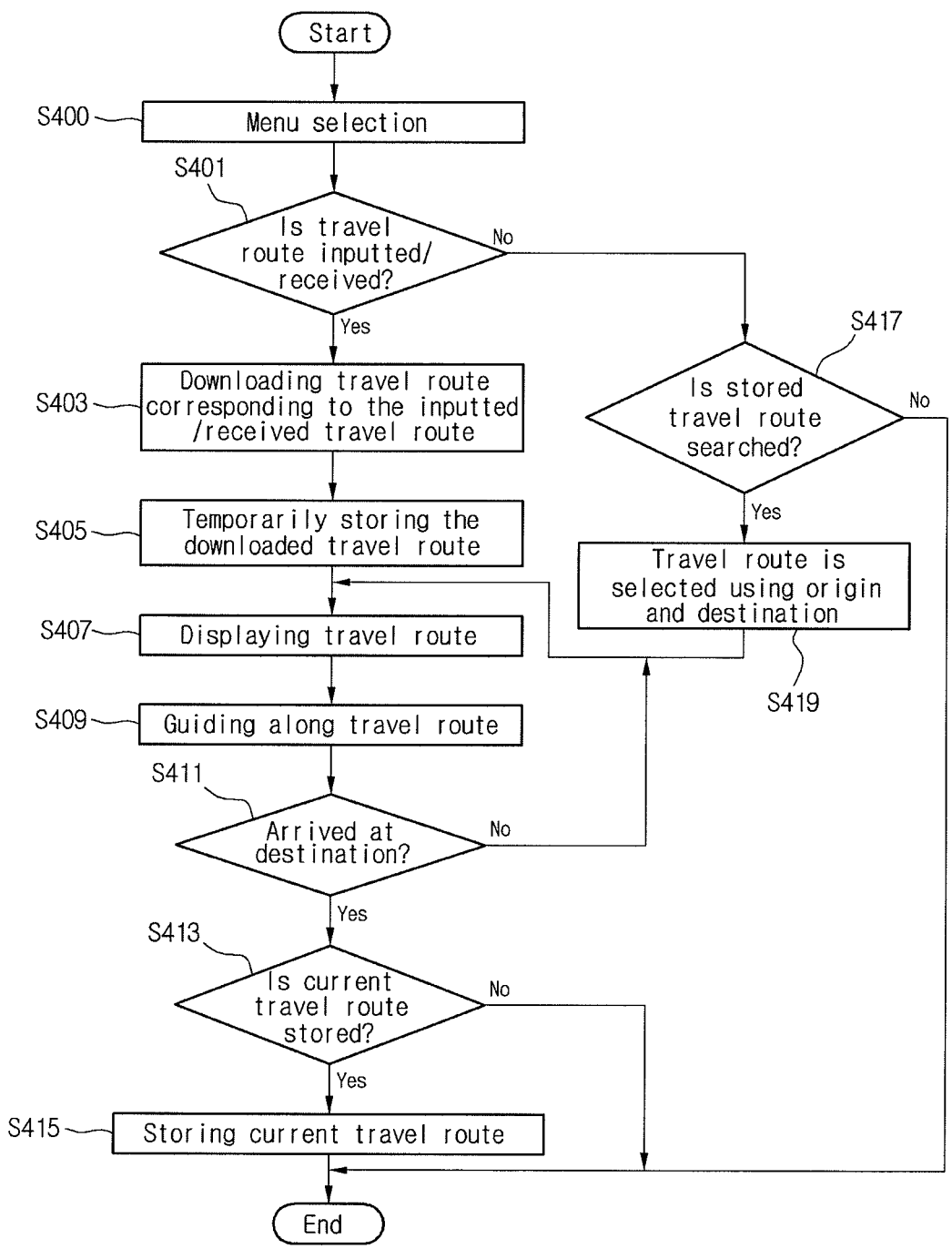
FIG. 4 is a flowchart illustrating a method for providing a travel route in a navigation system according to an exemplary embodiment of the present invention.

As shown in FIGS. 3 and 4, after a user selects a menu through a menu key provided for the front board 303 (S400), the user inputs the origin and the destination corresponding to the travel route. The received origin and destination is transmitted to the central processing unit 336 through a key control unit 330 installed in the main board 327 that is connected to the interface board 306, thereby requesting the traveling route corresponding to the received origin and destination (S401).

The CPU 336 recognizes the current location and the traveling direction of the moving object on the basis of the GPS signal to track the travel trace, and searches the travel route from the origin to the destination inputted by the user. At this time, the LCD control unit 333 controls to read the travel route from the memory 339 under the control of the CPU 336 to display the travel route on the LCD 300 through the interface board 306. Further, the travel route corresponding to the origin and the destination can be downloaded from the traffic information center (S403). The travel route is an optimal traveling route, and is temporarily stored in the memory until the moving object arrives at the destination (S405).

The optimal travel route is preferably selected by the user or by a predetermined reference from the map data read from the memory or from the routes downloaded from the traffic information center. The user can select a via or a specific on-road as the travel route.

When the user searches the travel route stored in the memory without the input of the travel route (S417), the stored travel route is displayed on the LCD display unit such that the user can select one of the stored traveling routes (S419). That is, the previously stored origin and destination is displayed together with the hot key such that the user can easily recognize and select the travel route. Accordingly, the user determines the origin and the destination to select the travel route by using the hot key.

The selected travel route is displayed on the LCD 300 (S407), to guide the moving object traveling on the road (S409).

Then, a determination concerning whether or not the moving object arrives at the destination is made (S411). Then, if the moving object arrives at the destination, it is inquired of the user whether or not a current travel route would be stored (S413). If the user selects to store the current travel route, the current travel route is stored in a predetermined area of the storage unit (S415).

Meanwhile, in case the user requests the travel route in a voice, a traffic information message containing an audio signal is received from the traffic information center. At this time, the central processing unit 336 outputs the received traffic information to the audio board 342. The audio board 342 processes the received traffic information into a voice signal through the signal-processing unit 348 and outputs the voice signal to an exterior through the amp 369 under a control of the microcomputer 354. Accordingly, the user can hear the traffic information of the second moving object in a voice. The voiced traffic information can be also stored together with the travel route.

Figure 5:
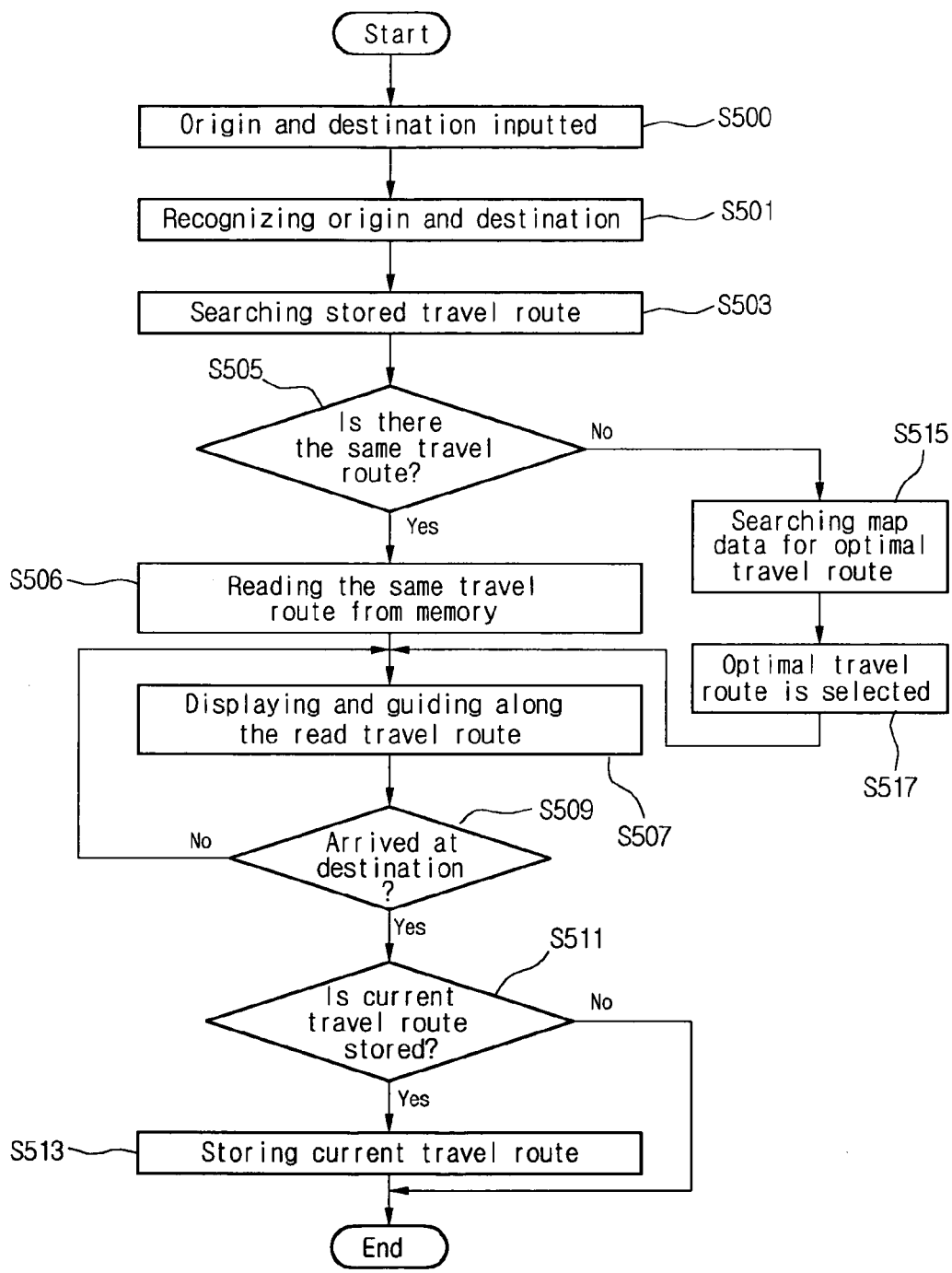
FIG. 5 is a flowchart illustrating a method for providing a travel route in a navigation system according to another exemplary embodiment of the present invention.

A method for providing a travel route according to another embodiment of the present invention is described as below with reference to FIG. 5.

If a user inputs an origin and a destination (S500), the received origin and destination is recognized (S501) and then, a travel route for the received origin and destination is searched among travel routes that are stored in a memory by the user (S503).

Then, when the travel route is searched, a determination is made concerning whether or not the same travel route is in the memory (S505). If it is determined that the same travel route is in memory, the same travel route is read from the memory (S506) to be displayed on the LCD 300, thereby guiding a moving object along the travel route.

However, if it is determined in the step S505 that the same travel route is not in memory, an optimal travel route corresponding to the received origin and destination is searched from map data of the memory (S515). The travel route with the shortest distance to the destination is determined and selected among the searched travel routes (S517), and the selected travel route is displayed for guidance (S507). The optimal travel route can be also requested and downloaded from a traffic information center.

Next, a current location of the moving object is compared with the destination of the travel route to determine whether or not the moving object arrives at the destination (S509). If the moving object arrives at the destination, it is inquired of the user whether or not the current travel route would be stored (S511).

At this time, if the user selects to store the current travel route, the travel route is stored in a predetermined area of the memory (S513).

Figures 6, 7:
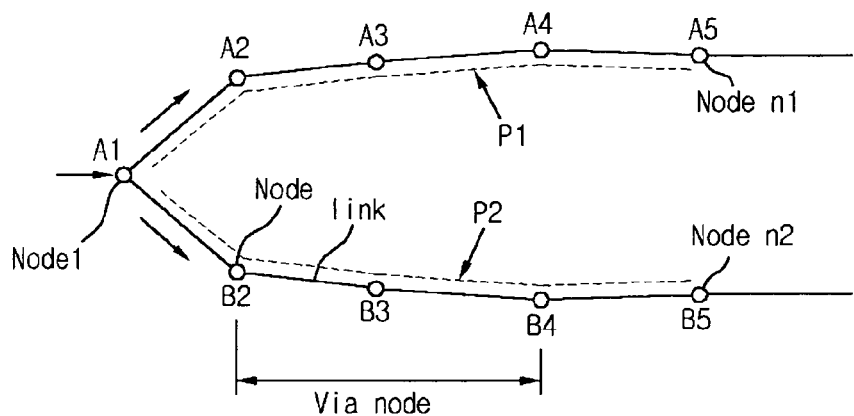
FIG. 6 is a node construction diagram illustrating an example of a travel route according to an exemplary embodiment of the present invention.
FIG. 7 is a map construction diagram illustrating an example of storing a travel route according to an exemplary embodiment of the present invention.

For example, as shown in FIG. 6, when the moving object travels along a travel route P1, a node A1 refers to an origin node, nodes A2 to A4 refer to a via node, and a node A5 refers to a destination node (Node n). The nodes, the origin, the destination, the via and the like are stored as the travel route. Here, the via can be also stored, as the traveling route, with the vicinity of the node being limited to a general building, or being mapped to a crossroad.

Figures 8, 9:
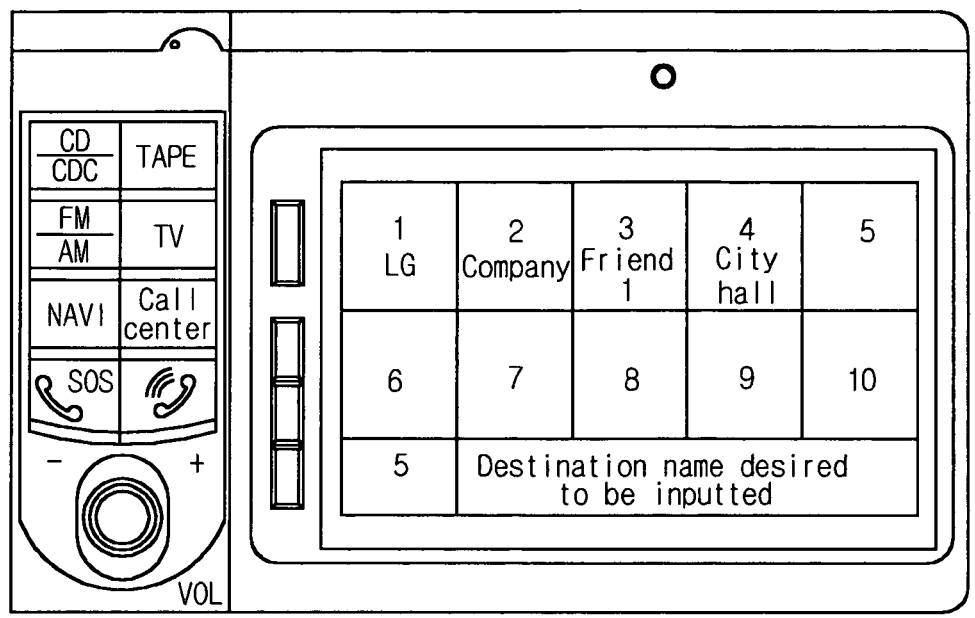
FIG. 8 illustrates an example of selecting a travel route using a hot key according to an exemplary embodiment of the present invention.
FIG. 9 is a map construction diagram illustrating an example of storing a travel route according to another exemplary embodiment of the present invention.

In the meantime, a method for storing the traveling route is shown in FIGS. 7 and 8.

As shown in FIG. 7, the stored travel route information includes hot key, date, origin node, via node, destination node, and travel route. The travel routes P1, P2, P3 . . . P11 are each stored using the hot keys 1, 2, 3 . . . 11. Since the hot keys 1 to 3 have the same origin node A1, the destination nodes A5, B5 and Cn can be displayed together with a real destination by using the hot key. That is, when the stored travel route is displayed for the user as shown in FIG. 8, the stored travel route can be displayed together with the destination nodes (e.g., A5, B5 and Cn) and the destinations (e.g., LG, company and Friend 1, etc.).

When the origin node A1 is a home or a company, different destination nodes A5, B5 and Cn are stored as a first group with reference to the origin node A1. For example, hot keys 1 to 10 have the travel routes with the origin nodes being the home and the destination nodes being different from one another.

The hot key 11 has the travel route from the origin node Bn being an arbitrary place to the destination node A1 being a specific place. For example, the hot key 11 has the travel route from a business trip place to the home. These travel routes can be classified as a second group (that is, for example, hot keys 11 to 20).

Moreover, when the moving object travels from an arbitrary place to other places, respective origins and destinations can be stored as an individual group. For example, when the moving object travels from the home to a department store, or from a department store A to another department store B, each of the travel routes can be classified as the individual group.

The travel route stored using the hot key can be read from the memory and provided on the screen by searching the desired travel route by using a search menu key and requesting the desired travel route by using the hot key.

Further, when the user directly inputs the origin and the destination or one of the via nodes not using the hot key, the user can also select one of the travel routes that are matched with received geographical names, travel routes and the like.

Here, as shown in FIG. 7, a travel route where at least two nodes are continuously connected can be also used as another stored traveling route. That is, travel routes where at least two of the via nodes (e.g., Node2, Node3 and Node4) are continuously connected, and travel routes where at least two of the via nodes (e.g., Node2-Node4) and the destination node (Node n) are continuously connected, can be used as one stored travel route. In order to utilize the above stored travel routes, coordinates of the nodes except for the origin node and the destination node can be provided, and the names of buildings and crossroads that are located closely to or corresponding to the coordinates can be provided.

As shown in FIG. 9, grouped hot keys 20, 30 and 40 have travel routes to a friend's home, a family's home and an associate' home, respectively. A list of the travel routes corresponding to a friend 1, a family 1 and an associate 1 can include only the origin and the destination as the geographical name and also, can include or not include a voice service.

As described above, because the travel route is stored in the memory, a user does not need to separately download the same travel route from the traffic information center when the user intends to travel along the same travel route as the stored travel route. This is so, because if it is determined by comparison that the origin and the destination are identical with a stored travel route, that stored travel route can be provided.

As another embodiment of the present invention, the origin, the destination and the like of the travel route are stored in an individual database of the traffic information center. Accordingly, the hot key can be used to request the stored travel route corresponding to the hot key from the traffic information center.

In another embodiment of the present invention, when the navigation system requests the traffic information of the optimal travel route, the traffic information center can provide a service of the optimal travel route by informing the user of the earlier stored travel route together with any or all variable environments on the traveling route.

The navigation system transmits/receives the traffic information by using the mobile communication network and the wireless communication. As an example, the mobile communication network and the navigation system transmit the transmitted and received traffic information by using a Short Message Service (SMS).

As described above, the present invention has an effect in that the navigation system can store the travel route of a moving object according to the user's request to repetitively provide the user with the same travel route, thereby not needing to be connected with the traffic information center for the service of the desired travel route.

Further, the present invention has an effect in that the navigation system can embody an additional function of repetitively using the stored travel route to the destination such that the user can construct the database.

It will be apparent to those skilled in the art, that various modifications and variations can be made in the present invention. Thus, it is intended that the present invention covers the modifications and variations of this invention provided they come within the scope of the appended claims and their equivalents.

What is claimed is:

1. An apparatus for providing a travel route in a navigation system, the apparatus comprising:
    a GPS (Global Positioning System) receiver configured to receive position data from a plurality of GPS satellites;
    a storage unit configured to store map data and travel route information including a plurality of travel routes therein;
    a display unit configured to display the stored map data and travel route on a screen thereof;
    a key input unit configured to receive a variety of input key signals, and an origin and a destination therebetween;
    a velocity and direction detection unit configured to detect a travel velocity and direction of a moving object;
    a wireless communication unit configured to detect to receive traffic information with respect to an on-road;
    a control unit configured to control storage of the travel route in the storage unit and to provide the stored travel route for a user for (1) determining whether or not a user inputs to the navigation an origin and a destination of a travel route for guidance of a moving object and (2) if it is determined that the navigation system is not in an input mode when a user inputs the origin and the destination, determining whether or not the navigation system is in a search mode wherein the user searches for a desired travel route, and (3) if it is determined that the navigation system is in a search mode, searching and selecting a desired travel route through a user activated hot key to display a plurality of travel routes each having an origin node and a destination node;
    a user activated hot key configured to (1) store a travel route having at least one of an origin node or a destination node, and (2) request a desired travel route; and
    a display unit configured to display the at least one of stored map data, travel route data and hot key data on a screen thereof.

2. The apparatus according to claim 1, wherein the travel route is matched to each destination to be stored in the storage unit.

3. The apparatus according to claim 1, wherein the travel route is grouped and stored with reference to the origin or the destination.

4. The apparatus according to claim 1, wherein when the moving object arrives at the destination along a current travel route, the control unit inquires of a user whether or not the current travel route would be stored, and then to store the current travel route in a predetermined area of the storage unit.

5. The apparatus according to claim 1, wherein if the user inputs the origin and the destination, the control unit compares the received origin and destination with the stored travel route and then provides the stored travel route corresponding to the received origin and destination.

6. The apparatus according to claim 1, wherein the stored travel route comprises the origin, a via, the destination, the traveling route, the hot key, and time information for guidance of the moving object.

7. The apparatus according to claim 1, wherein the stored travel route comprises an origin node, a destination node and a via node.

8. The apparatus according to claim 1, wherein the user activated hot key is configured to (1) store the travel route having at least one of an origin node or a destination node, and (2) request the stored travel route using the hot key being used for storing the travel route.

9. The apparatus according to claim 1, wherein the apparatus comprises a plurality of hot keys for storing a plurality of travel routes, each having at least one of an origin node or a destination node, and means for displaying at least one of an origin node or a destination node and a hot key.

10. The apparatus according to claim 9, wherein the plurality of hot keys corresponds to travel routes having the same origin node.

11. The apparatus according to claim 1, wherein the destination node of a travel route stored by using a hot key is displayed with the hot key.

12. The apparatus according to claim 1, wherein the apparatus comprises a plurality of hot keys for storing a plurality of travel routes, each having at least one of an origin node and a destination node, and wherein, if a plurality of hot keys have the same origin node, different destination nodes are displayed together with the plurality of hot keys.

13. The apparatus according to claim 1, wherein the user activated hot key is configured to store one travel route and to request a corresponding travel route.

14. The apparatus according to claim 1, further comprising plural hot keys, and wherein the plurality of travel routes are matched, respectively, to the plurality of hot keys.

15. The apparatus according to claim 1, further comprising means configured to classify user activated hot keys with a group of travel routes.

16. The apparatus according to claim 15, wherein the group of travel routes comprises at least two different travel routes.

17. The apparatus according to claim 1, further comprising means to input traffic information of road conditions with respect to a road on which a vehicle can travel, including at least one of traffic stagnation, traffic retardation, slow traffic movement, traffic accidents, and roads under-construction.

18. The apparatus according to claim 17, further comprising means configured to transmit the selected traffic information, a moving object travel velocity, and a current location of the moving object, to be transmitted with a message to a traffic information center.

19. A method of providing a travel route in a navigation system, comprising:
    (a) receiving an origin and a destination;
    (b) determining whether or not a travel route corresponding to the received origin and destination is identical with a travel route stored in a storage unit;
    (b-1) if it is determined that the corresponding travel route is identical with the stored travel route, reading the stored travel route from the storage unit to display the stored travel route on a screen; and
    (b-2) if the corresponding travel route is not identical with the stored traveling route, reading the corresponding travel route from map data of the storage unit to display the read travel route on a screen, or/and downloading the corresponding travel route from a traffic information center to display the downloaded travel route on a screen;
(c) determining whether or not the moving object arrives at the received destination;
   (c-1) if it is determined that the moving object arrives at the received destination, inquiring of a user whether or not a current travel route would be stored; and
   (c-2) if the user elects to store the current travel route, storing the current travel route and its relation information, wherein the relation information comprises at least two of the origin, the destination, a hot key, and time;
(d) using a of user activated hot keys to (1) store a plurality of travel routes each having an origin node and a destination node; and (2) request a desired travel route using the same hot key utilized to store the travel route;
(e) displaying stored map data, travel route data and hot key stored travel routes on a screen thereof; and
(f) controlling storage of the travel route in the storage unit and providing the stored travel route for a user for
   (1) determining whether or not a user inputs to the navigation an origin and a destination of a travel route for guidance of a moving object,
   (2) if it is determined that the navigation system is not in an input mode when a user inputs the origin and the destination, determining whether or not the navigation system is in a search mode wherein the user searches for a desired travel route, and
   (3) if it is determined that the navigation system is in a search mode, searching and selecting a desired travel route through a user activated hot key to display a plurality of travel routes each having an origin node and a destination node.

20. The method according to claim 19, wherein the stored travel route comprises an origin node, a destination node and a via node.

21. A method for providing a travel route in a navigation system, the method comprising:
(a) determining whether or not a user inputs to the navigation system an origin and a destination of a travel route for guidance of a moving object;
   (a-1) if it is determined that the navigation system is not in an input mode where the user inputs the origin and the destination, determining whether or not the navigation system is in a search mode where the user searches for a desired travel route;
   (a-2) if it is determined that the navigation system is in the search mode, searching and selecting the desired travel route through a user activated hot key to display a plurality of travel routes each having an origin node and a destination node; and
   (a-3) displaying the selected traveling route on the screen to guide the moving object along the displayed travel route;
(b) if it is determined that the user inputs the origin and the destination, recognizing a current position and a travel direction of the moving object on the basis of a GPS (Global Positioning System) signal to track the moving object along a travel trace, and searching for an optimal travel route from the origin to the destination;
(c) displaying an optimal travel route on a screen to guide the moving object along the optimal travel route;
(d) determining whether or not the moving object arrives at the destination and then, if it is determined that the moving object arrives at the destination, inquiring of the user whether or not a current travel route would be stored; and
(e) if the user selects to store the current travel route, storing the current travel route in a predetermined area of a storage unit.

22. The method according to claim 21, wherein, in the step (b), the optimal travel route is selected among a travel route received from a traffic information center using a wireless communication network and a travel route searched from map data of the storage unit.

23. The method according to claim 21, wherein, in the step (a-2), a search screen for the travel route is provided for the user to see the origin and the destination of the travel route and select the desired travel route.

24. The method according to claim 21, wherein in the step (a-2), the search screen for the travel route is provided for the user to see only the destination of the travel route and select the desired travel route.

25. A method for storing a traveling route in a navigation system, comprising:
using hot keys to store travel route information, wherein each one of a plurality of travel routes has an origin node and a destination node, and wherein each stored travel route has the same origin node;
using a hot key utilized to store the travel route information to select a travel route from the plurality of travel routes with the same origin node and a different destination node;
classifying a plurality of hot keys with a group of different destination nodes together as a group of hot keys; and
wherein the method further comprises: controlling storage of the travel route in a storage unit and providing the stored travel route for a user for
   (1) determining whether or not a user inputs to the navigation an origin and a destination of a travel route for guidance of a moving object, and
   (2) if it is determined that the navigation system is not in an input mode when a user inputs the origin and the destination, determining whether or not the navigation system is in a search mode wherein the user searches for a desired travel route, and
   (3) if it is determined that the navigation system is in a search mode, searching and selecting a desired travel route through a user activated hot key to display a plurality of travel routes each having an origin node and a destination node.

26. A method for storing a traveling route in a navigation system, comprising:
using hot keys for storing travel route information, wherein each one of a plurality of travel routes has an origin node and a destination node, and wherein each stored travel route has the same destination node;
using a hot key utilized to store the travel route information to select a travel route with the same destination node and different origin nodes; and
classifying hot keys with a group of different origin nodes together as a group of hot keys.

27. The method according to claim 26, further comprising:
reading from a memory, and displaying on a screen, a travel route stored using a hot key by using a search menu key and requesting the desired travel route by using the hot key.

28. The method according to claim 27, further comprising:
matching a travel route with a specific identifier, and selecting the travel route using the specific identifier.

29. A method for storing a traveling route in a navigation system, comprising:
- using hot keys for storing travel route information as a group of travel routes, wherein each one of a plurality of travel routes has an origin node and a destination node, and wherein each stored travel route has a selected origin among different origin nodes and destination nodes;
- using a hot key utilized to store travel route information to select a travel route with the selected origin and destination nodes;
- classifying hot keys with the selected origin of the different origin nodes and destination nodes; and
- controlling storage of the travel route in a storage unit and providing the stored travel route for a user for
  - (1) determining whether or not a user inputs to the navigation an origin and a destination of a travel route for guidance of a moving object,
  - (2) if it is determined that the navigation system is not in an input mode when a user inputs the origin and the destination, determining whether or not the navigation system is in a search mode wherein the user searches for a desired travel route, and
  - (3) if it is determined that the navigation system is in a search mode, searching and selecting a desired travel route through a user activated hot key to display a plurality of travel routes each having an origin node and a destination node.

30. The method according to claim 29, further comprising: reading from a memory, and displaying on a screen, a travel route stored using a hot key by using a search menu key and requesting the desired travel route by using the hot key.

31. An apparatus for providing a travel route in a navigation system, the apparatus comprising:
- a GPS (Global Positioning System) receiver for receiving position data from a plurality of GPS satellites;
- a storage unit for storing map data and travel route information including a plurality of travel routes therein;
- a key input unit for receiving a variety of input key signals, and an origin and a destination therebetween;
- a velocity and direction detection unit for detecting a travel velocity and direction of a moving object;
- a wireless communication unit for communicating to receive traffic information with respect to an on-road;
- a control unit for controlling storage of the travel route in the storage unit and to provide the stored travel route for a user;
- a plurality of hot keys adapted to store and request a plurality of travel routes with the same destination node and different origin nodes, wherein the same hot key is adapted to store and request a specific travel route; and
- a display unit for displaying the stored map data, travel route data and hot key data on a screen thereof.

32. The apparatus according to claim 31, further comprising means for classifying a specific group of travel routes as a specific group of hot keys and wherein a first group of hot keys corresponds to travel routes having the same destination node.

33. An apparatus for providing a travel route in a navigation system, the apparatus comprising:
- a GPS (Global Positioning System) receiver configured to receive position data from a plurality of GPS satellites;
- a storage unit configured to store map data and travel route information including a plurality of travel routes therein;
- a display unit configured to display the stored map data and travel route on a screen thereof;
- a key input unit configured to receive a variety of input key signals, and an origin and a destination therebetween;
- a velocity and direction detection unit configured to detect a travel velocity and direction of a moving object;
- a wireless communication unit configured to detect to receive traffic information with respect to an on-road;
- a control unit configured to control storage of the travel route in the storage unit and to provide the stored travel route for a user for (1) determining whether or not a user inputs to the navigation an origin and a destination of a travel route for guidance of a moving object and (2) if it is determined that the navigation system is not in an input mode when a user inputs the origin and the destination, determining whether or not the navigation system is in a search mode wherein the user searches for a desired travel route, and (3) if it is determined that the navigation system is in a search mode, searching and selecting a desired travel route through a user activated hot key to display a plurality of travel routes each having an origin node and a destination node;
- a specific single user activated hot key configured to both (1) store a travel route having at least one of an origin node or a destination node without handling any additional hot key, and (2) request a desired travel route without using any additional hot key; and
- a display unit configured to display the at least one of stored map data, travel route data or hot key data on a screen thereof.

* * * * *